(No Model.) 3 Sheets—Sheet 1.
A. B. LANDIS.
FEED MECHANISM FOR SAW MILLS.
No. 337,507. Patented Mar. 9, 1886.
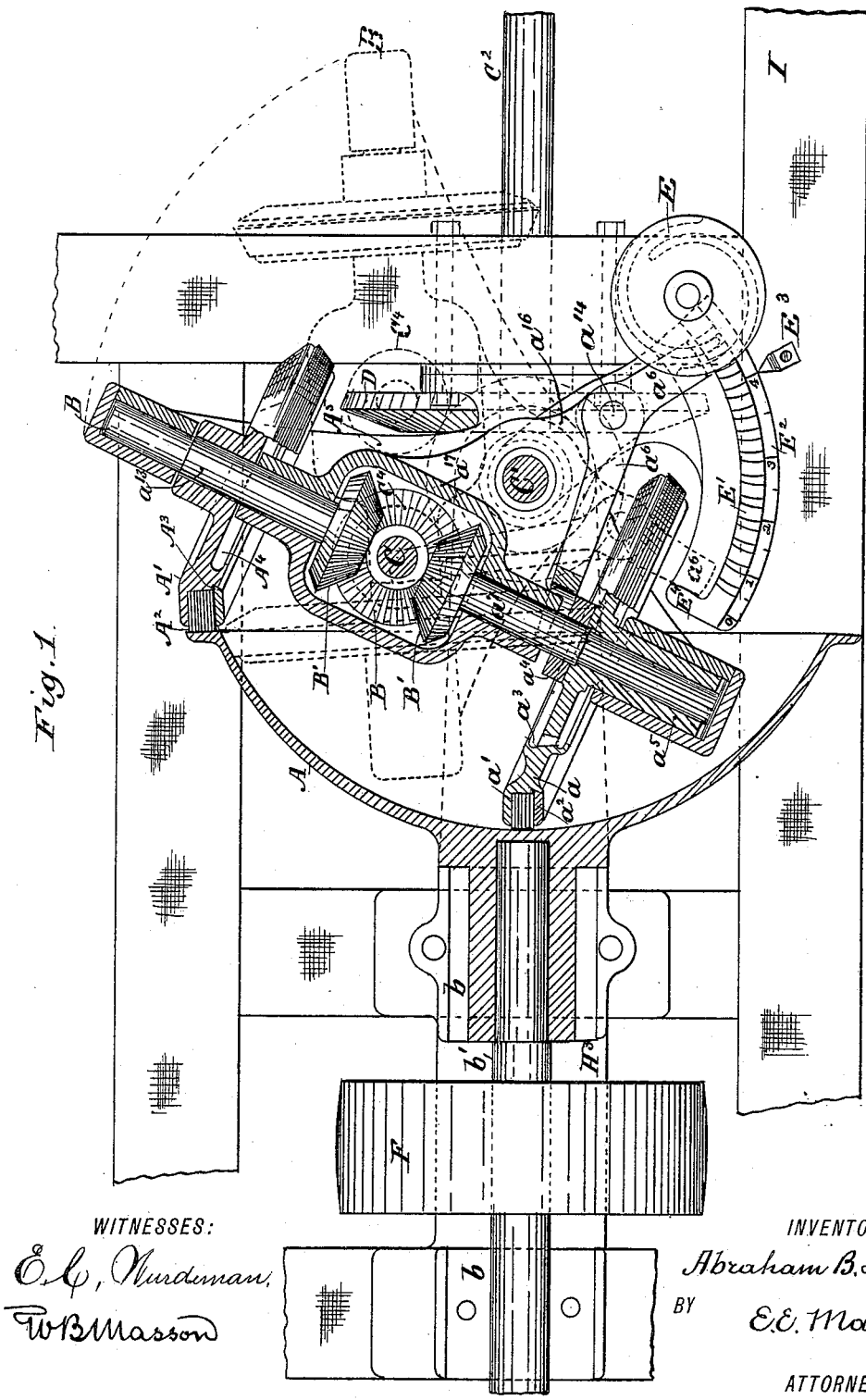
WITNESSES:
INVENTOR
Abraham B. Landis
BY E. E. Masson
ATTORNEY

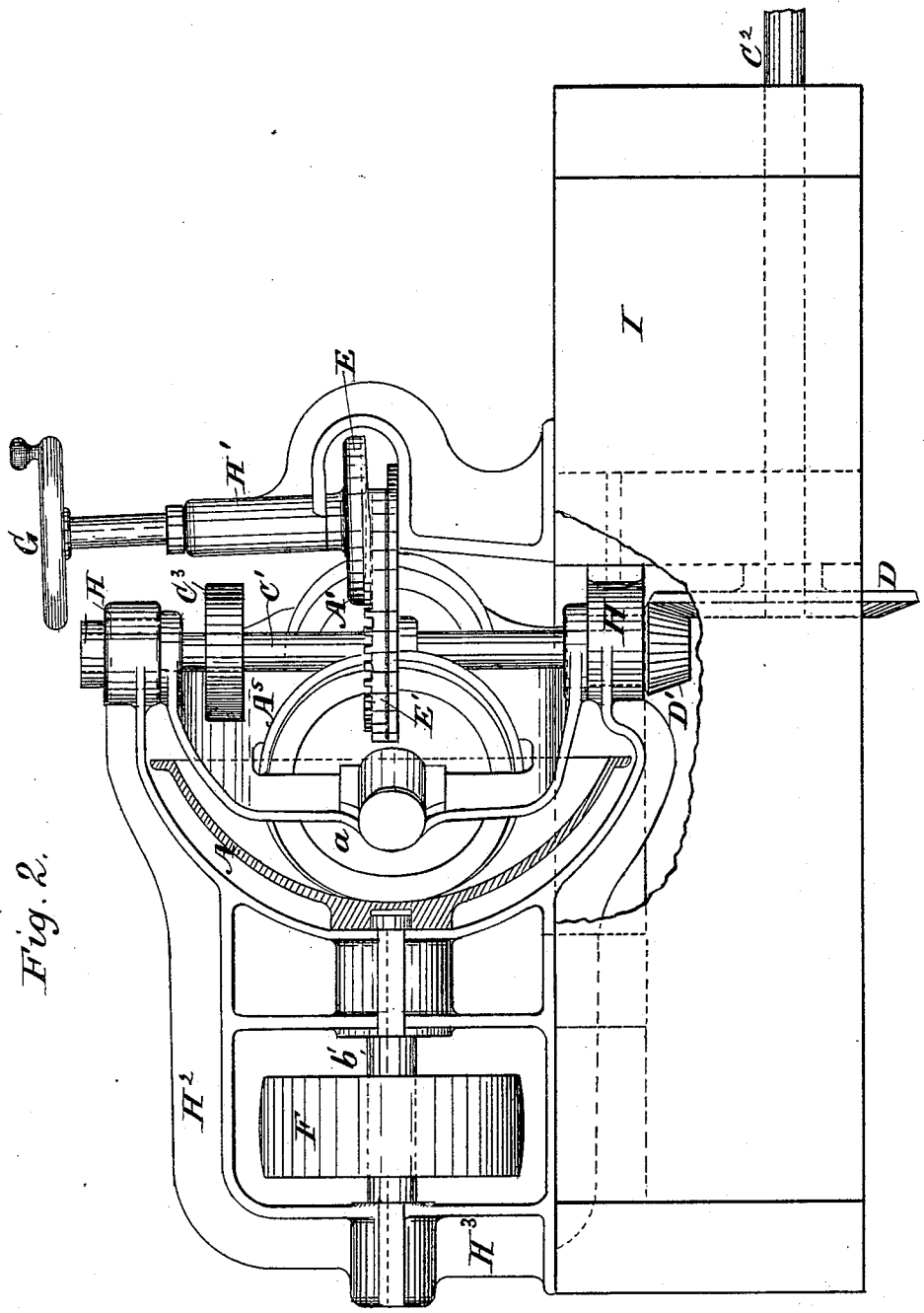

(No Model.) 3 Sheets—Sheet 3.
A. B. LANDIS.
FEED MECHANISM FOR SAW MILLS.
No. 337,507. Patented Mar. 9, 1886.
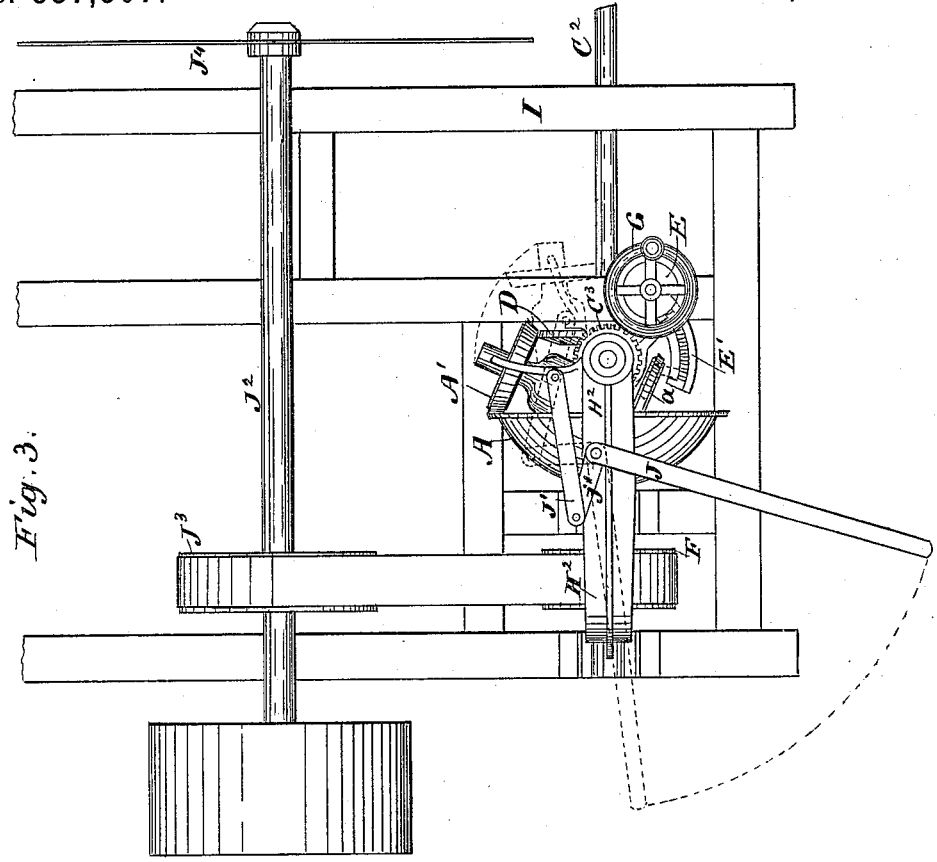
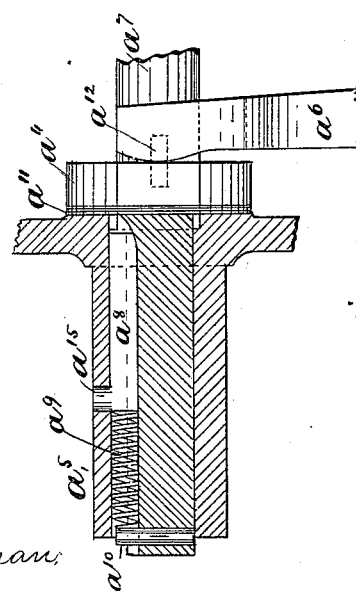
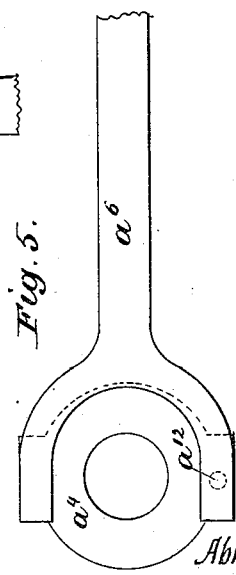
Witnesses:
Inventor:
Abraham B. Landis
by E. E. Masson
atty.

UNITED STATES PATENT OFFICE.

ABRAHAM B. LANDIS, OF WAYNESBOROUGH, PENNSYLVANIA.

FEED MECHANISM FOR SAW-MILLS.

SPECIFICATION forming part of Letters Patent No. 337,507, dated March 9, 1886.

Application filed January 7, 1886. Serial No. 187,846. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Feed Mechanisms for Saw-Mills, of which the following is a specification, reference being had therein to the accompanying drawings.

My invention relates to improvements in mechanisms capable of transmitting a variable friction-feed to be used in connection with saw-mills and other machinery; and the objects of my improvement are to provide a concave disk as one of the frictional surfaces in connection with a wheel adapted to travel from the center to the circumference of said disk, so that with an increase of speed an increase of friction will be automatically produced against the concave surface of the disk. I attain these objects by the mechanism illustrated in the accompanying drawings, in which—

Figure 1 is a top view, partly in section, of a variable friction-feed mechanism constructed in accordance with my invention. Fig. 2 is an elevation of the same with the concave frictional disk in section. Fig. 3 is a top view of the feed mechanism on a small scale, but complete and connected with a saw-mill carriage. Fig. 4 is a longitudinal section through the hub and shaft of one of the friction-wheels with a part of the operating-lever and collar. Fig. 5 is a side view of said lever and collar.

In the drawings, A represents a nearly semi-spherical concave disk mounted upon one end of a shaft, $b'$, retained in suitable bearings, $b$, and carrying a pulley, F, through which motion is transmitted to the feed mechanism, to be hereinafter described.

The concavity of the disk A is turned true on a radius passing through the axis of the shaft C', upon which some of the feed-operating gears are mounted, and through the axis of the trunnions H H of a swinging frame, $A^5$, carrying in suitable bearings the shaft $a^7$ $a^{13}$, in line with each other and the shaft C, at right angles to the shafts $a^7$ $a^{13}$. Upon the shaft $a^7$ is mounted a wheel, $a$, having its periphery—a frictional paper surface, $a'$—clamped therein by means of a ring, $a^2$, secured to said wheel by screws or bolts. This wheel has projecting on one side a hub, $a^5$, which runs into a bearing forming a part of the swinging frame $A^5$. The hub $a^5$ is bored centrally to receive one end of the shaft $a^7$. The paper-surfaced wheel $a$ runs against the concave surface of the disk A, and is the wheel which (through others) feeds the log against the saw, and, as the feed should be variable, this is accomplished by swinging the frame $A^5$ from the position shown in full lines to the position shown in dotted lines in Fig. 1. By this swinging the paper-surfaced wheel $a$ is shifted from the center or smallest diameter on the disk to the largest diameter, when that part of the disk has the longest path, and consequently the two extremes of speed are transmitted to the wheel $a$ by its following these paths. This is indicated by the register $E^2$ becoming shifted from 0 to 4 in its relation to the pointer $E^3$, these numbers indicating the number of inches traveled by the log during each revolution of the saw.

The inner end of the shaft $a^7$ carries a miter-pinion, B', that gears with a miter-pinion, B, on the upright shaft C, and the pinion B gears with a similar pinion, B', upon the shaft $a^{13}$, that also carries a paper-rimmed wheel, A', which is used for the "gig-back," or to return the log or carriage again to the starting-point. The periphery of this wheel bears against the flanged rim of the concaved disk and always has the same speed, which does not require to be varied.

By the arrangement of the miter-gears shown the motions of the two wheels B' B' are reverse to each other, and consequently a reverse motion of the carriage of the saw-mill is obtained, as the two paper-rimmed wheels travel on the disk on the same side of its center.

Upon the vertical shaft C is mounted a spur-pinion, $C^4$. (Shown only by dotted circles in Fig. 1.) This pinion gears into the wheel $C^3$, Figs. 2 and 3, mounted upon the central vertical shaft, C', that passes through the bearings H H, and at the lower end of said shaft C' it carries a bevel-pinion, D', which meshes into the bevel-gear D, secured upon the carriage-shaft $C^2$, which drives the log-carriage back and forth.

Mounted upon the vertical shaft C' is a sector, E', which has teeth upon its upper surface, in which engage the segmental teeth of a scroll-wheel, E, which is operated by a hand-wheel, G, on the upper end of a vertical shaft, G', passing through said scroll-wheel. The hand-wheel and scroll-wheel move the sector back and forth as desired for the different speeds.

Pivoted at $a^{14}$ to a lug, $a^{16}$, cast with the cap $a^{17}$, forming one-half of the bearing or a portion of the swinging frame $A^5$, there is a lever, $a^6$, that impinges against a stop or flange, $E^4$, projecting upward from the end of said sector while in the act of reversing the swinging frame from the gig-back motion to the feed-motion; and it will be seen that by moving the swinging frame $A^5$ from the position shown in full lines to the position shown by dotted lines this lever $a^6$ will come in contact with the flange $E^4$ and force the opposite end of the lever against the collar $a^4$, (shown on a large scale in Figs. 4 and 5,) which thrusts the friction-wheel $a$ against the disk and starts the feed of the machine. This wheel is held away from the surface of the disk by the spring $a^9$, Fig. 4, when the lever $a^6$ is released; consequently this wheel is not brought to bear against the disk until the swinging frame is moved to the desired point for a proper feeding. This is done by the sector E', which can be moved at any time while sawing, and it will be seen that the action of this lever $a^6$ is automatic, and that as soon as said lever strikes the flange $E^4$ on the end of the sector the feed is started and the resistance in driving the carriage thrusts the swinging frame in this same direction, and has for its stop only the flange $E^4$ against the lever $a^6$, and by having the ends of said lever properly proportioned, or the location of the pivot $a^{14}$ thereon, a suitable pressure is obtained against the collar $a^4$, and consequently also against the wheel $a$. The pressure necessary to obtain a proper driving-friction is sustained without any aid with the lever J, Fig. 3, and it is apparent that as the duty required from the friction is increased in the same ratio the pressure increases; consequently the device is automatic as regards the friction required. As the friction-wheel requires no attention, the little hand-wheel G can be manipulated at will to increase or diminish the feed while the saw is going through the log. When the cut is completed, the attendant takes hold of the lever J and shifts it to the position shown in full lines in Fig. 3 and the feed stops, as at that moment the rim of the wheel $a$ leaves the disk, owing to the end of the lever $a^6$ leaving the flange or stop $E^4$ on the sector, and also to the spring $a^9$, (although the latter might not be necessary, as the angle upon which the wheel $a$ meets the disk has a tendency to separate it from said disk;) but the spring will insure the separation until the end of the lever $a^6$ is in contact with the flange $E^4$. Between the hub of the wheel $a$ and the collar $a^4$ are placed a series of washers, $a''$, to insure durability to the wearing surfaces.

To permit the spring $a^9$ to force the hub of the wheel $a$ longitudinally upon its shaft $a^7$, the key $a^8$ is used mainly to prevent the wheel $a$ from turning on the shaft $a^7$. It has a pin, $a^{15}$, that enters a hole in the hub, and can slide in a slot in the shaft, $a^7$, and transversely through the end of said shaft there is a pin, $a^{10}$, for one end of the spring to bear against, while the other end presses against the key, and consequently against the wheel $a$.

To prevent the collar $a^4$ from turning, a pin, $a^{12}$, is inserted in one of the branches of the fork in one end of the lever $a^6$, and said pin also enters into a hole in the collar $a^4$. No pin is inserted into the other branch of the fork, so that it can slide a little against the collar and permit the radial movement of the lever $a^6$.

As above stated, the wheel A' gives the gig-back movement, and as the pressure produced by the resistance to the swinging frame in driving the carriage back (as the thrust on this frame is now in the contrary direction from what it was in feeding) is not quite sufficient, a slight pressure should be brought on the lever J, said lever being pivoted to the frame $H^2$ and connected by the links J' and $j'$ to the frame $A^5$. As the gig-back movement is very quick, the operator's hand should remain on the lever, while gigging-back, to be ready to promptly reverse and stop it.

In Fig. 3 the pulley F of the friction-feed device is shown as connected by means of a belt with the pulley $J^3$ upon the arbor $J^2$ of the saw $J^4$, the whole being mounted upon the husk-frame I; but the device may be mounted at right angles to the present arrangement, and be also driven by means of bevel-gears or other suitable means, and although it is shown as connected with the arbor of a saw for a saw-mill it may be applied to drive other mechanisms. The face of the gig-back friction-wheel is conical and gives a perfect rolling-surface. Heretofore flat disks have been used in connection with wheels running against them. By these means rolling friction is not perfect, but there is a constant shearing or slipping on the surfaces; but with a concave disk, as soon as the friction-wheel leaves the center toward the periphery the rolling becomes more perfect, and it is at that point that it is more required—namely, in running fast feed—and as the bearing-surface of the friction-wheel is increased by traveling in a concave disk there is greater efficiency of friction, and also more durability of the paper-surfaced wheel.

Having now fully described my invention, I claim—

1. In a variable-feed mechanism, a concave disk having its lowest point on its axis, in combination with the wheel adapted to travel on its inner surface from the center to the periphery thereof, substantially as described.

2. In a variable-feed mechanism, a concave disk having its lowest point on its axis, in combination with a swinging frame and a wheel adapted to travel on the inner surface of said disk, substantially as and for the purpose described.

3. In a variable-feed mechanism, a concave disk, in combination with a swinging frame, a wheel thereof adapted to travel on the inner surface of said disk, and a wheel adapted to travel on the rim of said concave disk, substantially as and for the purpose described.

4. In a variable-feed mechanism, a concave disk, in combination with a swinging frame carrying a shaft and a feed-wheel having an endwise movement upon said shaft, substantially as described.

5. In a variable-feed mechanism, a concave disk having its lowest point on its axis, in combination with a swinging frame carrying a shaft and a feed-wheel, and a lever controlling said feed-wheel, substantially as described.

6. In a variable-feed mechanism, a concave disk, in combination with a swinging frame carrying a shaft, and a feed-wheel, a lever controlling said feed-wheel, and a sector controlling said lever, substantially as described.

In testimony whereof I affix my signature in presence of two witnesses.

ABRAHAM B. LANDIS.

Witnesses:
D. M. GOOD, Jr.,
C. E. BESORE.